(12) United States Patent
Kovacs et al.

(10) Patent No.: US 9,442,215 B2
(45) Date of Patent: Sep. 13, 2016

(54) SYSTEMS AND METHODS FOR ATTACHING AND POSITIONING A SENSOR ON A LUMINAIRE FIXTURE

(71) Applicant: General Electric Company, Schenectady, NY (US)

(72) Inventors: Norbert Kovacs, Budapest (HU); Roland Batai, Budapest (HU); Andras Kuti, Budapest (HU); Daniel Lorincz, Budapest (HU)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 52 days.

(21) Appl. No.: 14/513,473

(22) Filed: Oct. 14, 2014

(65) Prior Publication Data

US 2016/0103242 A1    Apr. 14, 2016

(51) Int. Cl.
*G01S 17/66* (2006.01)
*G01V 8/12* (2006.01)
*G01V 13/00* (2006.01)
*F21V 23/04* (2006.01)

(52) U.S. Cl.
CPC ............. *G01V 8/12* (2013.01); *F21V 23/0471* (2013.01); *G01V 13/00* (2013.01)

(58) Field of Classification Search
CPC .......... G01S 17/66; G01V 13/00; G01V 8/12
See application file for complete search history.

(56) References Cited

U.S. PATENT DOCUMENTS

| | | |
|---|---|---|
| 5,626,417 A | 5/1997 | McCavit |
| 6,091,200 A | 7/2000 | Lenz |
| 6,781,129 B2 | 8/2004 | Leen |
| 7,651,281 B2 | 1/2010 | Wen |
| 8,530,840 B2 | 9/2013 | Carberry et al. |
| 2012/0217897 A1* | 8/2012 | Gordin .................... F21S 8/086 315/294 |
| 2015/0222820 A1* | 8/2015 | Costigan ................ H04N 3/155 348/142 |

* cited by examiner

*Primary Examiner* — Mark R Gaworecki
(74) *Attorney, Agent, or Firm* — GE Global Patent Operation; Peter T. DiMauro

(57) ABSTRACT

Provided is a detection system for a luminaire fixture including a sensor and a laser meter to allow positioning of a sensor for precise positioning toward a viewing area. The sensor includes a sensor mount to attach the detection system to an existing luminaire, a sensor lens to perceive a viewing area, and a sensor housing to protect the sensor lens. The laser meter includes a laser to project a focused light path for positioning, and a laser housing to protect the laser. The sensor lens is positioned with respect to the laser, causing the sensor lens to move with respect to the laser. Also provided is a method for configuring an adjustable detection system for a luminaire.

20 Claims, 5 Drawing Sheets

SYSTEMS AND METHODS FOR ATTACHING AND POSITIONING A SENSOR ON A LUMINAIRE FIXTURE

FIELD OF INVENTION

The present invention relates generally to attaching and positioning sensors on luminaire fixtures. More specifically, the present invention relates to attaching a sensor to a pre-existing luminaire fixture and precisely positioning the sensor.

BACKGROUND OF THE INVENTION

Many conventional lighting fixtures (luminaires) include high efficiency fixtures and automated controls that make adjustments based on occupancy, e.g., sensors allow for operation whenever someone is within a scanned area, or daylight sensing, e.g., sensors allow for operation based on the amount of sunlight within a scanned area. These passive infrared (PIR) motion detectors are widely used on both indoor and outdoor lighting of commercial, industrial, and residential spaces to provide the proper lighting given factors such as time of day and position of lighting, among others.

When an infrared emitting object, such as a person, enters the viewing zone of the sensor, the lamps connected to the sensor are automatically activated to illuminate the desired area at which the lamps are aimed. One problem with such controls is that the viewing zone of the sensor is limited causing the lamps not to automatically activate if the infrared emitting object approaches the light fixture from an angle outside the viewing zone.

Previous attempts to broaden the viewing zone of automatic lighting fixtures have been attempted. One solution includes use of wide-angle motion detectors designed to extend the viewing zone of the sensor to an angle greater than 180 degrees by using a plurality of inclined infrared mirror faces, designed to direct sufficient intensity of radiation to the sensor from outlying angles. However, non-precision measuring instruments such as mirrors retain dirt or fog over time, thus reducing the operation of the sensor. Additionally, with only one measuring device, the system is susceptible if the sensor fails.

Another solution includes a motion detector assembly with a primary motion sensor and a secondary motion sensor. However, both the primary and secondary motion sensors use infrared sensors rather than more precise detection systems. Additionally, slight adjustments to either of the sensors could lead to an unintended viewing zone.

Additionally, mounting PIR sensors onto existing luminaires can be complicated and cumbersome. Furthermore, positioning installed PIR sensors can be time consuming to ensure proper direction an accuracy.

SUMMARY OF EMBODIMENTS OF THE INVENTION

Given the aforementioned deficiencies, a need exists for systems and methods that can easily set a detection area to sense motion (e.g., from a vehicle) in any direction. The system would additionally be configured to mount to existing luminaires.

It is an objective of the present technology to allow precise positioning of a motion sensor to cover a range of angles for lighting applications. One aspect of the present technology mounts a sensor holder unit and a laser distance meter to an intelligent lighting system (e.g., smart luminaire) for accurate positioning.

In the embodiments, a detection system unit includes a sensor and a laser meter to allow positioning of a sensor for precise positioning toward a viewing area. The sensor includes, among others, (i) a sensor mount, to attach the detection system to an existing luminaire, (ii) a sensor lens, to perceive the viewing area, and (iii) a sensor housing, to protect the sensor lens. The sensor is configured to have a sensor housing that rotates to allow positioning at a range of angles for specific lighting applications. The laser meter includes, among others, (i) a laser, to project a focused light path for positioning, and (ii) a laser housing, to protect the laser. The sensor lens is positioned with respect to the laser, causing the sensor lens to move with respect to the laser.

In some embodiments, the sensor lens is configured to at least partially perceive motion generated by an infrared emitting object.

In some embodiments, the sensor and the laser meter are of a size and shape to not obstruct a luminous flux emitted from the luminaire.

It is another object of the present technology to optimize sensing motion on traveled surfaces (e.g., roads and walkways). Motion on the road surface can trigger luminaires to return maximum light output from a dimmed value which can result in energy saving.

In some embodiments, the laser housing is configured to attach to the sensor housing. Alternately, the laser housing is attached to the sensor housing using an adapter with a beginning perimeter configured to receive the sensor housing and an ending perimeter configured to receive the laser housing.

In some embodiments, the laser is positioned at a sensor centerline located between the first sensor boundary and the second sensor boundary. In these embodiments, the sensor is positioned to move along a path parallel to the laser meter. In alternate embodiments, the laser is positioned at the first sensor boundary or the second sensor boundary.

Another aspect of the present technology is a method for configuring an adjustable detection system for a luminaire. The method includes positioning the sensor housing to the laser housing, attaching the sensor housing to the laser housing, and positioning the sensor lens with respect to the laser such that the laser path is approximately parallel to the sensor path.

Further features and advantages of the invention, as well as the structure and operation of various embodiments of the invention, are described in detail below with reference to the accompanying drawings. It is noted that the invention is not limited to the specific embodiments described herein. Such embodiments are presented herein for illustrative purposes only. Additional embodiments will be apparent to persons skilled in the relevant art(s) based on the teachings contained herein.

BRIEF DESCRIPTION OF THE DRAWINGS

The accompanying drawings, which are incorporated herein and form part of the specification, illustrate the present invention and together with the description, further serve to explain the principles of the invention and to enable a person skilled in the relevant art(s) to make and use the invention.

DETAILED DESCRIPTION OF THE PREFERRED EMBODIMENTS

While the present invention is described herein with illustrative embodiments for particular applications, it should be understood that the invention is not limited thereto. Those skilled in the art with access to the teachings provided herein will recognize additional modifications, applications, and embodiments within the scope thereof and additional fields in which the invention would be of significant utility.

Unless defined otherwise, technical and scientific terms used herein have the same meaning as is commonly understood by one of ordinary skill in the art to which this disclosure belongs. The terms "first," "second," and the like, as used herein do not denote any order, quantity, or importance, but rather are used to distinguish one element from another. Also, the terms "a" and "an" do not denote a limitation of quantity, but rather denote the presence of at least one of the referenced items. The term "or" is meant to be inclusive and mean either, any, several, or all of the listed items.

The use of "including," "comprising," or "having" and variations thereof herein are meant to encompass the items listed thereafter and equivalents thereof as well as additional items. The terms "connected" and "coupled" are not restricted to physical or mechanical connections or couplings, and can include electrical connections or couplings, whether direct or indirect. The terms "circuit," "circuitry," and "controller" may include either a single component or a plurality of components, which are either active and/or passive components and may be optionally connected or otherwise coupled together to provide the described function.

Figure 1:
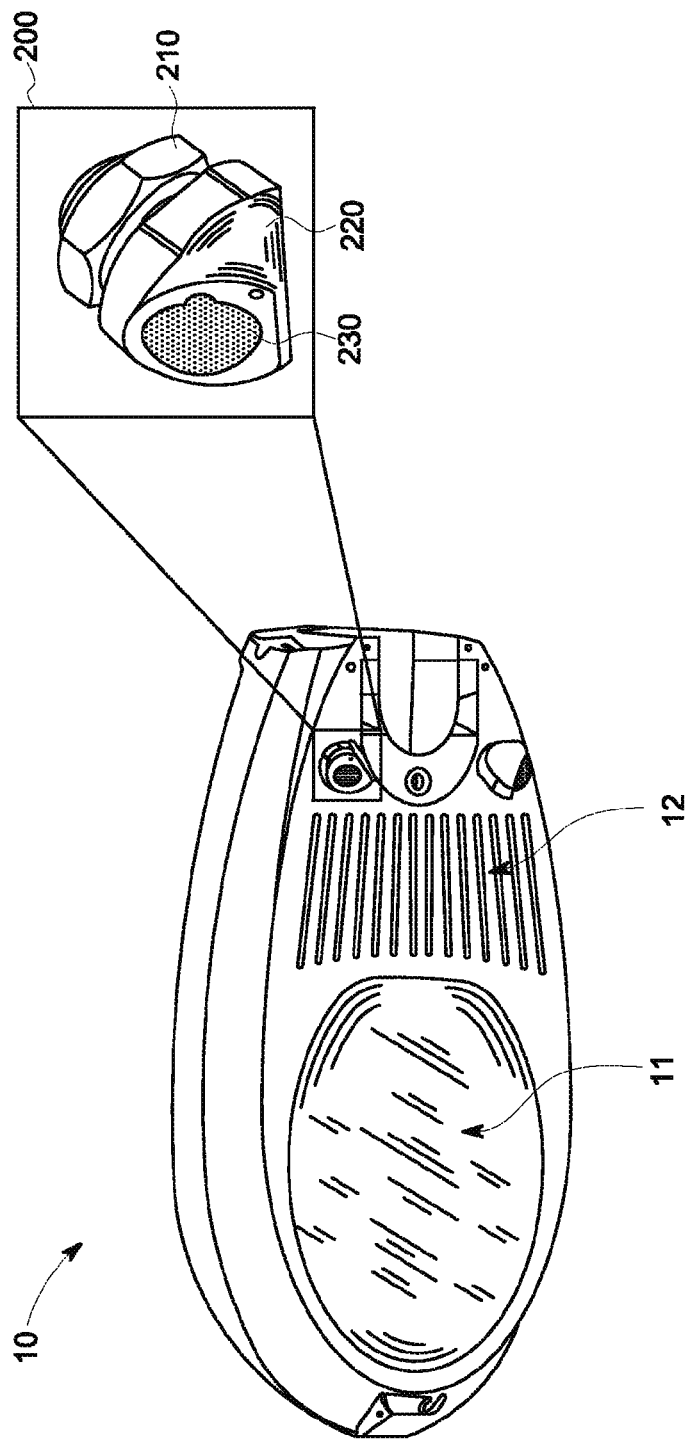
FIG. 1 is a bottom perspective view of a luminaire, including a callout showing details of a mounted sensor.

FIG. 1 illustrates a luminaire 10 including at least one sensor 200 under-mounted to a lighting housing 12.

The luminaire 10 provides an illumination (luminous flux) for specific lighting applications through use of a lighting assembly 11, housed within and protected by a lighting housing 12. The lighting assembly 11 may include light emitting components (e.g., light emitting diodes (LEDs)), to produce the illumination, and/or optical components (e.g., lenses, reflectors, mirrors) to refract, bend, or otherwise modify the illumination.

Depending on the application, the luminaire 10 can include additional components. For example, in an elevated application, the luminaire 10 may include a pole 13 (seen in FIG. 2) to hold the luminaire 10 above ground level. The pole 13 may also include an arm 14 to support the luminaire 10. As another example, the lighting assembly 11 may include a driver (not shown), to facilitate programming of the luminaire 10 to produce illumination. The driver may be controlled by any known programmable logic known in the art (e.g., programmable logic controller (PLC) or field-programmable gate array (FPGA)) used to set conditional events (e.g., intensity, wavelength, and direction of the light) on which the light assembly 11 functions.

One or more sensor(s) 200 can be attached to the lighting housing 12 to detect motion within one or more viewing area(s). When an object enters the viewing area(s), the sensor(s) 200 perceives the object and communicates with the light assembly 11 to illuminate the luminaire 10. When the object leaves the viewing area, the light assembly 11 can automatically dim and/or turn off after a pre-determined amount of time.

Each sensor 200 is of a size and shape that it can be attached to the lighting housing 12 without obstructing the lighting assembly 11. Each sensor 200 is also configured to rotate to allow positioning at a range of angles for specific lighting applications. The sensor(s) 200 can be standard PIR sensors or other types of motion detectors, such as but not limited to ultrasonic sensors, pyroelectric sensors, and the like.

Further details associated with the components of sensor 200 are described below. In embodiments described hereafter, the sensor 200 may be mounted with additional components to facilitate accurate positioning.

Figure 2:
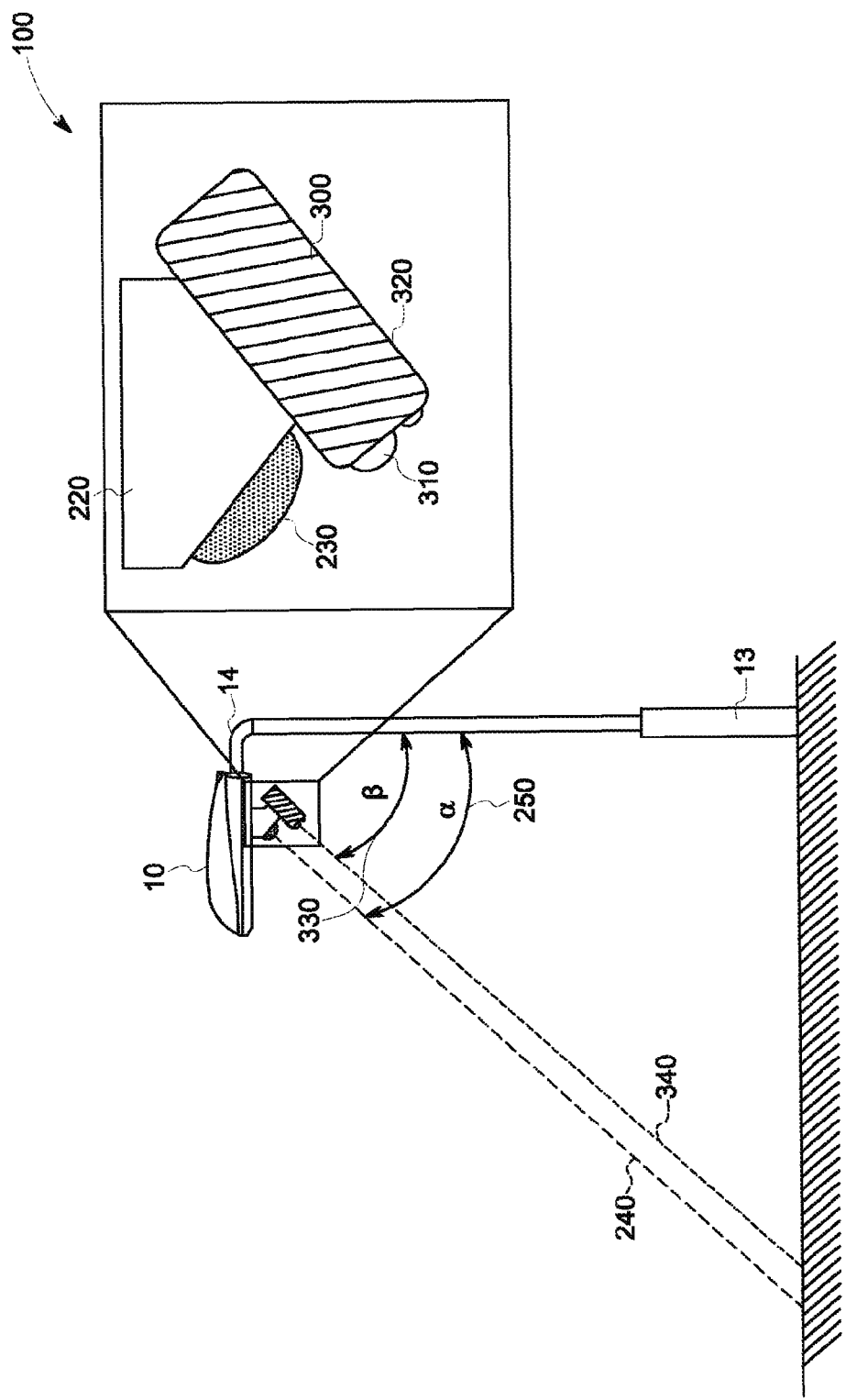
FIG. 2 is a side view of a luminaire assembly, including a callout showing an under-mounted detection system.

FIG. 2 illustrates a side view of the luminaire 10 including an under-mounted detection system 100. The detection system 100 includes the sensor 200, a laser meter 300, and in some embodiments, an adapter 400 to join the sensor 200 and the laser meter 300.

The sensor 200 (best seen in FIG. 1), includes a sensor mount 210, a sensor housing 220, a sensor lens 230, and a sensing mechanism (not shown).

The sensor mount 210 is configured to attach the sensor 200 to the lighting housing 12. The sensor mount 210 can be any traditional mounting mechanism (e.g., fastener, or the like). For example, the sensor mount 210 may include a nut and bolt fastener that attaches the sensor mount 210 to a planar surface of the lighting assembly 11. The nut and bolt fastener may be mounted (e.g., threaded) through a standard hole sized to accept the nut and bolt fastener.

The sensor housing 220 houses and protects the sensor lens 230 and the sensing mechanism from environmental elements (e.g., dust and water), making the sensor 200 suitable for outdoor usage. The sensor housing 220 is of a size and shape that adequately protects the sensor lens 230 while remaining attached to the sensor mount 210.

Figure 3:
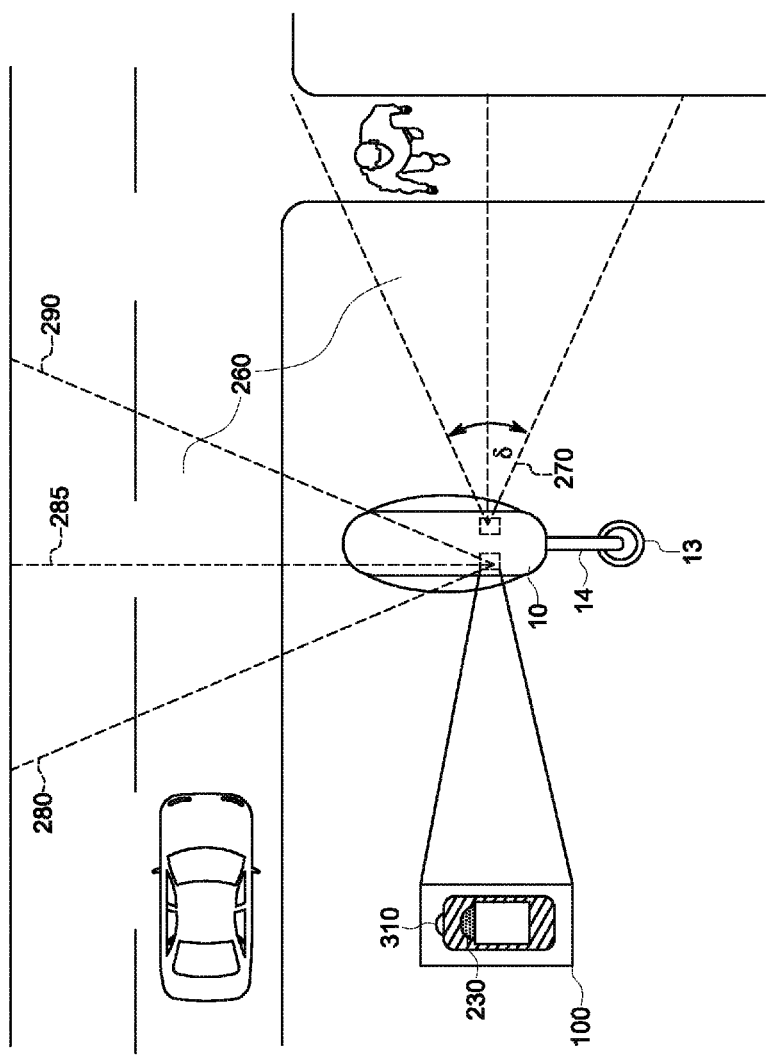
FIG. 3 is a top view of the luminaire assembly of FIG. 2, including a callout showing the under-mounted detection system, operating in an exemplary environment showing the scan area of the luminaire assembly.

Additionally, the sensor housing 220 can be pivotally adjusted to capture a viewing area 260 (represented as a shaded area in FIG. 3) of the sensor lens 230. The viewing area 260, described in greater detail below, is predetermined based on technical limits of the sensor lens 210. In the case of multiple sensors 200, each sensor housing 220 can be adjusted independently to create a customizable viewing area (e.g., viewing area 260). For example, the viewing area 260 for each of the sensors 200 can overlap thereby enabling the lamps to be automatically activated by objects approaching the sensors 200 from the side or behind.

The sensor lens 230 works in conjunction with the sensing mechanism to perceive a physical quantity. The physical quantity is then quantified and transmitted, for example, to an external memory and/or the driver that facilitates programming of the luminaire 10.

The sensor 200 creates a sensor path 240, which projects downward towards the ground. The range of the sensor path 240 is predetermined based on technical limits of the sensor 200, and may be approximately between 10 and 200 meters.

Additionally, the sensor 200 is positioned at a sensor angle (α) 250, taken with respect to the pole 13. To create the sensor angle 250, the sensor housing 220 can be elevated upward or downward from the arm 14 and/or the pole 13 thereby adjusting the sensor lens 230 and thus the viewing area 260. The sensor angle 250 may be between approximately 0 and 90 degrees.

In operation, the sensing mechanism perceives an object and/or activity, via the sensor lens 230, within the viewing area 260. The viewing area(s) 260 is defined by a viewing angle (δ) 270, seen in FIG. 3. The viewing angle 270 may be approximately between 0 to 180 degrees of coverage or more. The viewing angle 270 creates a first sensor boundary 280 and a second sensor boundary 290. The viewing area 260 can then be bifurcated by a sensor centerline 285. Specifically, an angle formed by the sensor centerline 285 and the first sensor boundary 280 is δ/2, and the angle formed by the sensor centerline 285 and the second sensor boundary 290 is δ/2. The sensor centerline 285 can be used to position the laser meter 300, as discussed below.

The detection system 100 further comprises a distant laser meter 300 (best seen in FIG. 2). The laser meter 300 can be a commercially available product that includes a laser 310 and a laser housing 320.

The laser 310 is a directional light with a concentrated beam, reflected by mirrors. In operation, the laser 310 creates a laser path 340, which projects to ground. Although, the characteristics of the laser path 340 is predetermined based on technical limits of the laser meter 300, the range of the laser path 340 may be approximately between 20 and 200 meters.

The laser path 340 creates a laser angle (β) 330 with the pole 13. The laser angle 330 can be approximately between approximately 0 and 90 degrees. For example, the laser angle 330 can be approximately 45 degrees.

Similar to the sensor housing 220, the laser housing 320 houses and protects the laser 310 from environmental elements and is of a size and shape that that can adequately protect the laser 310. The laser housing 320 can be pivotally adjusted to allow positioning similar to that of the sensor housing 220. The laser housing 320 can be attached directly to the sensor housing 220, or attached to the adapter 400, as described below.

The laser meter 300 may include additional components to contribute functionality. For example, the laser meter 300 may include one or more photocells to create an electrical connection. As another example, the laser meter 300 may include timers to determine a period of time (e.g., 1 minute to 5 minutes) to dim/turn off the lighting assembly 11, when no objects and/or activity is perceived in the viewing area 260.

As seen in FIG. 2, the laser 310 is approximately parallel to the direction of movement detection as perceived through the sensor lens 230. Stated another way, the sensor lens 230 and the laser 310 are positioned in the same direction, making the laser path 340 and the sensor path 240 approximately parallel.

Paralleling the sensor path 240 and the laser path 340 makes it is possible to determine whether a detected object is outside the range of the sensor path 240. Specifically, whether the detected object is within the viewing area 260. Paralleling the sensor path 240 and the laser path 340 also allows an optimal direction to be assigned to the sensor 200 by the laser meter 300.

To create the optimal direction, the sensor 200 and the laser meter 300 may be affixed to each other, such that movement of one causes movement of the other. For example, the laser meter 300 may be positioned at the center of the viewing area 260 (e.g., at the sensor centerline 285), causing the sensor 200 to move along a path parallel to the laser meter 300. Thus, as the position of the laser 310 changes, so does the center position of the viewing area 260. Using the sensor centerline 285 as a point of reference for positioning the laser 310 may be beneficial when the viewing area 260 is a general application area (e.g., a flat road).

Alternately, the sensor lens 230 and the laser 310 can be positioned in different directions. For example, the laser 310 may be positioned at either the first sensor boundary 280 or the second sensor boundary 290. Using one of the sensor boundaries 280, 290 as a point of reference may be beneficial when the viewing area 260 needs to begin at a particular location (e.g., intersection of two roads).

After the optimal direction of the sensor 200 is set, the laser meter 300 can be optionally detached from the sensor 200.

In some embodiments, the sensor 200 and the laser meter 300 are joined through the presence of an adapter 400. The adapter 400 may be attached to the sensor 200 and/or the laser meter 300 by any number of conventional techniques including, but not limited to mechanical fasteners (e.g., nuts, bolts, rivets), fabrication (e.g., soldering, welding), or the like.

Figure 4A:
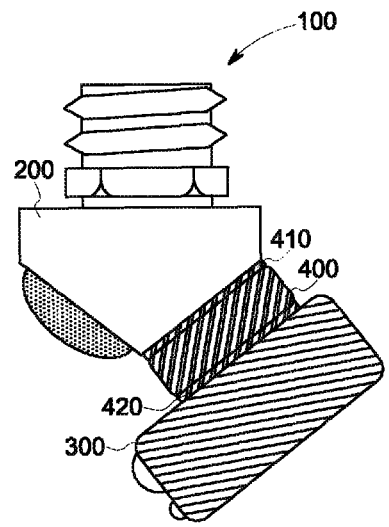
FIG. 4A is a side view of the under-mounted detection system of FIG. 2 including an optional adapter.

To connect the sensor 200 and the laser meter 300, in one embodiment, seen in FIG. 4A, the adapter 400 may have a beginning perimeter configured to attach to the sensor housing 220 and an ending perimeter configured to attach to the laser housing 320.

The beginning perimeter 410 and the ending perimeter 420 of the adapter 400 may be of the same size and/or shape. Consistency in the beginning perimeter 410 and the ending perimeter 420 may be desirable when mass production of the adapter 400 is required.

Alternately, the beginning perimeter and the ending perimeter of the adapter 400 may differ in size and/or shape. Altering the size and/or shape may be desirable for unique applications containing for example, fragile components.

Figure 4B:
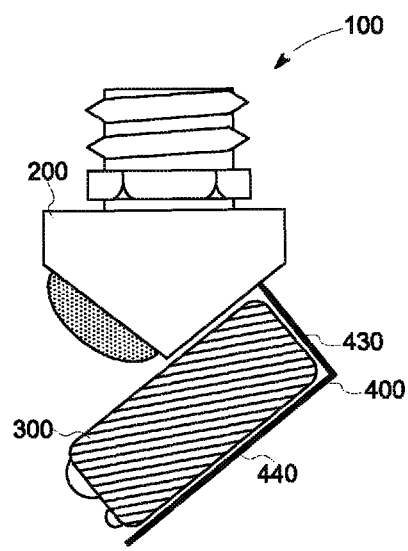
FIG. 4B illustrates an alternate embodiment of an adapter in the detection system of FIG. 4A.

In another embodiment, seen in FIG. 4B, the adapter 400 may have a first extension 430, configured to attach, either directly or indirectly, to the sensor housing 220, and a second extension 440, configured to attach, directly or indirectly, to the laser housing 320. The first extension 430 and the second extension 440 can be of different characteristics (e.g., size and shape).

Figure 5:
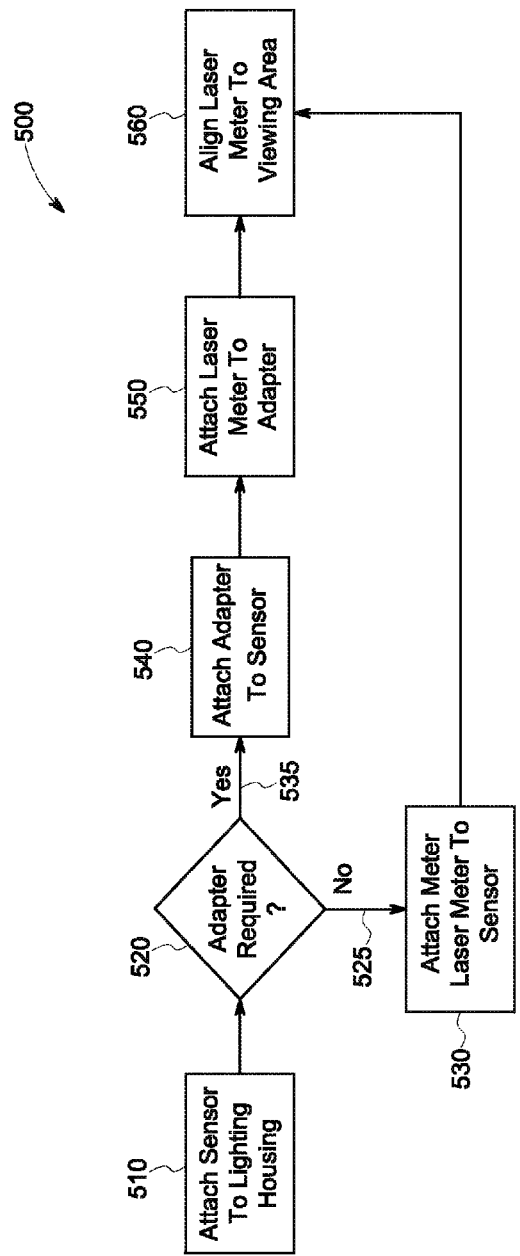
FIG. 5 is a flowchart of an exemplary method for configuring an adjustable detection system for a luminaire according to the present teachings.

FIG. 5 illustrates a method 500 for configuring the detection system 100 for use with the luminaire 10.

It should be understood that the steps of the methods are not necessarily presented in any particular order and that performance of some or all the steps in an alternative order, including across these figures, is possible and is contemplated.

The steps have been presented in the demonstrated order for ease of description and illustration. Steps can be added, omitted, and/or performed simultaneously without departing from the scope of the appended claims. It should also be understood that the illustrated method or sub-methods can be ended at any time.

First, at step 510, the sensor 200 is attached to the lighting housing 12. As described above, the sensor 200 includes the sensor mount 210, which attaches to the lighting housing 12 through any number of mounting mechanisms (e.g., nut and threaded bolt fastener).

Once the sensor 200 is attached to the lighting housing 12, at step 520, it must be determined whether an adapter (e.g., adapter 400) is required to attach the laser meter 300 to the sensor 200. For example, the adapter 400 may be required if the sensor 200 and the laser meter 300 do not include compatible mounting components (e.g., male and female threading connectors).

If the adapter 400 is not required (e.g., path 525), the laser meter 300 may be attached directly to the sensor 200, at step 530.

Alternately, if the adapter 400 is required (e.g., path 535), the adapter 400 is attached to the sensor 200 at step 540. As stated above, the adapter 400 has multiple embodiments, and can include the beginning perimeter 410 or a first extension 430, configured to attach to the sensor housing 220.

Additionally, the adapter 400 has the ending perimeter 420 or a second extension 440 configured to attach to the laser housing 320, as seen at step 550.

Once the sensor 200 and the laser meter 300 are attached, either to one another or to the adapter 400, the laser 310 within the laser meter 300 is aligned with the viewing area 260 of the sensor as seen in step 560. Aligning the laser 310 with the viewing area 260 create the optimal direction. As noted above, the laser meter 300 may be positioned, for example, at the sensor centerline 285, the first sensor boundary 280, or the second sensor boundary 290.

It is to be appreciated that the Detailed Description section, and not the Summary and Abstract sections, is intended to be used to interpret the claims. The Summary and Abstract sections may set forth one or more but not all exemplary embodiments of the present invention as contemplated by the inventor(s), and thus, are not intended to limit the present invention and the appended claims in any way.

What is claimed is:

1. An adjustable detection system for use with a luminaire comprising:
    a sensor comprising a sensor lens that creates a sensor path at a sensor angle, the sensor lens configured to perceive a viewing area defined by at least a first sensor boundary and a second sensor boundary; and
    a laser meter comprising a laser configured to project a laser path at a laser angle for positioning of the sensor path in a direction corresponding to the laser path, wherein the sensor lens is positioned with respect to the laser, causing the sensor lens to move in the direction corresponding to the laser path.

2. The system of claim 1, wherein the laser path is positioned approximately parallel to the sensor path.

3. The system of claim 1, the sensor further comprising a sensor mount configured to affix the sensor to a lighting housing of the luminaire.

4. The system of claim 1 wherein the sensor lens is configured to at least partially perceive motion generated by an infrared emitting object.

5. The system of claim 1 wherein the sensor lens is secured by a sensor housing, the laser is secured by a laser housing, and the laser housing is configured to attach to the sensor housing.

6. The system of claim 5 further comprising an adapter having a beginning perimeter configured to receive the sensor housing and an ending perimeter configured to receive the laser housing.

7. The system of claim 1 wherein the laser is positioned at a sensor centerline located between the first sensor boundary and the second sensor boundary.

8. The system of claim 1 wherein the laser is positioned at the first sensor boundary or the second sensor boundary.

9. An adjustable detection system for use with a luminaire comprising:
    a sensor comprising a sensor lens secured by a sensor housing, the sensor lens creating a sensor path at a sensor angle, the sensor lens configured to perceive a viewing area defined by a first sensor boundary and a second sensor boundary;
    a laser meter comprising a laser secured by a laser housing; and
    an adapter comprising a first extension, configured to attach to the sensor housing, and a second extension, configured to attach to the laser housing, wherein the laser is configured to project a laser path for positioning of the sensor path in a direction corresponding to the laser path, and wherein the sensor lens is positioned with respect to the laser, causing the sensor lens to move in the direction corresponding to the laser path.

10. The system of claim 9, wherein the laser path is positioned approximately parallel to the sensor path.

11. The system of claim 9, the sensor further comprising a sensor mount configured to affix the sensor to a lighting housing of the luminaire.

12. The system of claim 9 wherein the laser is positioned at a sensor centerline located between the first sensor boundary and the second sensor boundary.

13. The system of claim 9 wherein the laser is positioned at the first sensor boundary or the second sensor boundary.

14. A method for configuring an adjustable detection system for a luminaire, comprising:
    attaching, to a lighting housing, a sensor housing that secures a sensor lens, configured to create a sensor path at a sensor angle to perceive a viewing area defined by a first sensor boundary and a second sensor boundary; and
    attaching, to the sensor housing, a laser housing securing a laser, configured to create a laser path,
    projecting, via the laser, the laser path for positioning the sensor path in a direction corresponding to the laser path.

15. The method of claim 14 further comprising, aligning the sensor lens is with respect to the laser such that the laser path is approximately parallel to the sensor path.

16. The method of claim 14, the sensor housing further comprising a sensor mount configured to affix the sensor housing to a lighting housing of the luminaire.

17. The method of claim 14 further comprising attaching, to the sensor housing an adapter having a beginning perimeter configured to receive the sensor housing and an ending perimeter configured to receive the laser housing.

18. The method of claim 14 further comprising, attaching, to the sensor housing an adapter comprising a first extension, configured to attach to the sensor housing, and a second extension, configured to attach to the laser housing.

19. The method of claim 14 wherein the laser is positioned at a sensor centerline located between the first sensor boundary and the second sensor boundary.

20. The method of claim 14 wherein the laser is positioned at the first sensor boundary or the second sensor boundary.

\* \* \* \* \*